Aug. 14, 1945.  E. K. BENEDEK  2,382,389
PROPELLER MECHANISM
Filed May 24, 1941  11 Sheets-Sheet 1
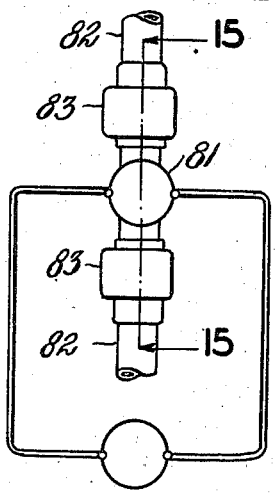
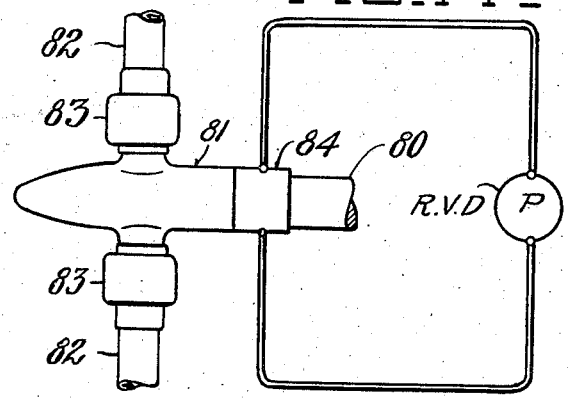
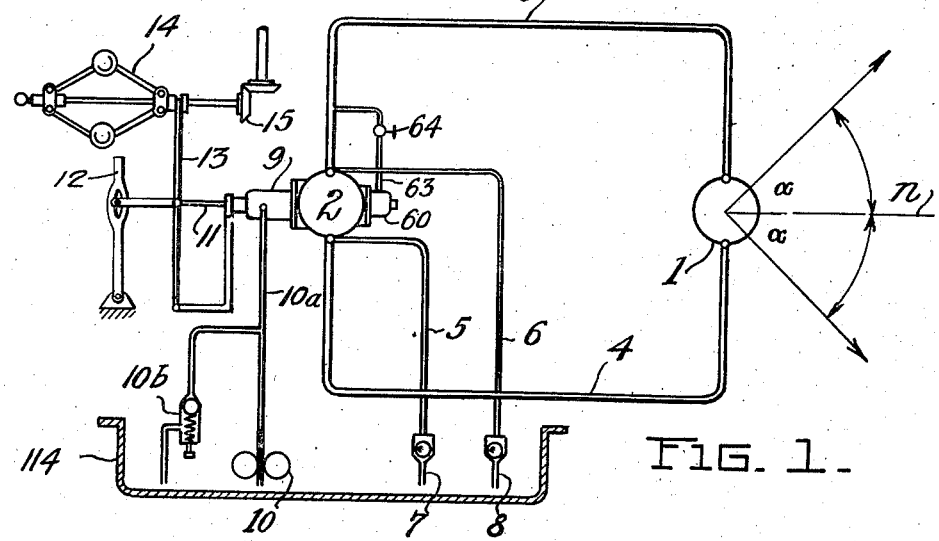
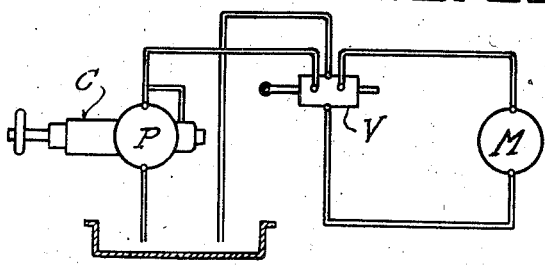
INVENTOR.
ELEK K. BENEDEK.
BY Baldwin & Wight
his ATTORNEYS INVENTOR.
ELEK K. BENEDEK
BY Baldwin & Wight
his ATTORNEYS

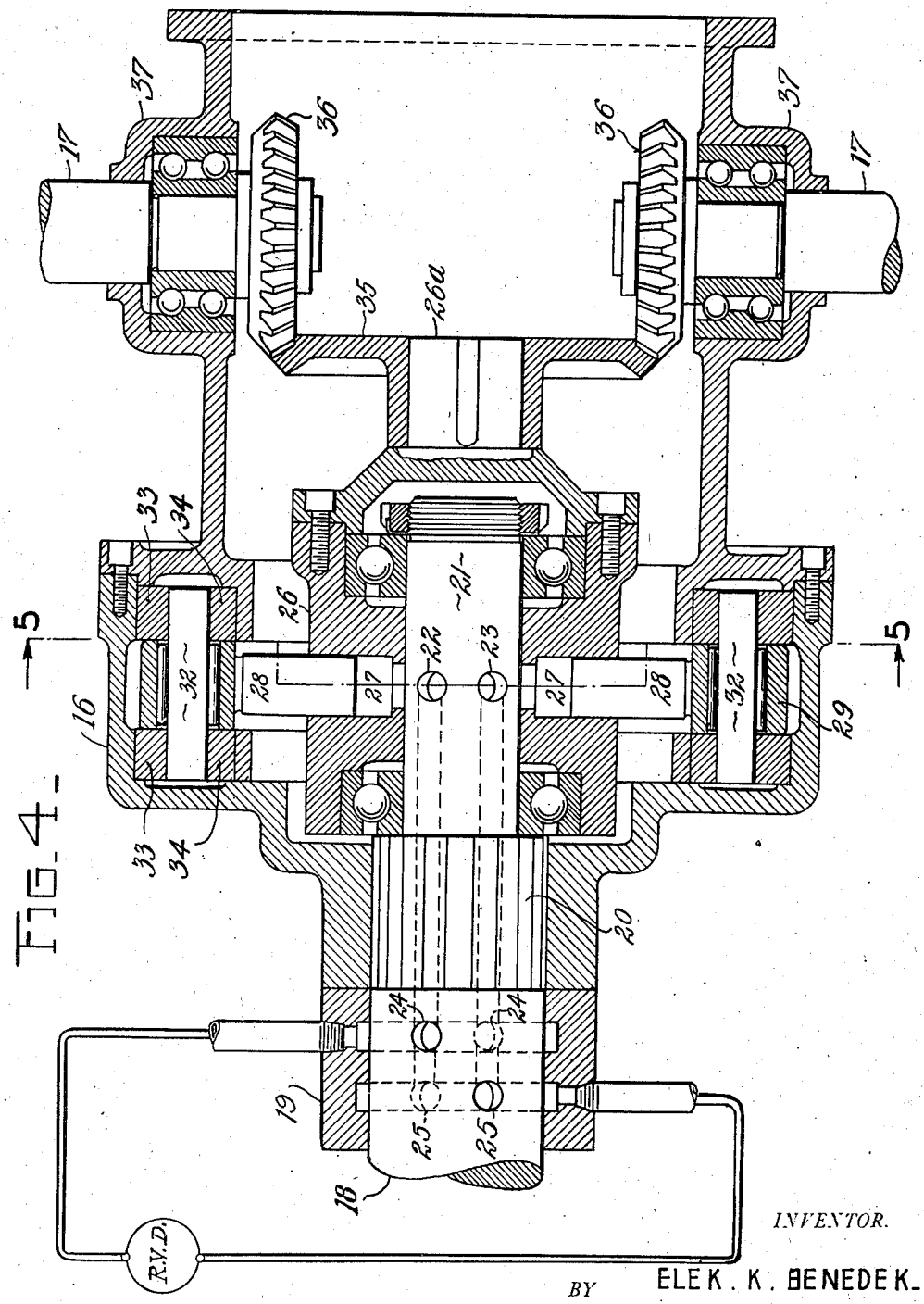

Aug. 14, 1945.  E. K. BENEDEK  2,382,389
PROPELLER MECHANISM
Filed May 24, 1941   11 Sheets-Sheet 4

INVENTOR.
ELEK K. BENEDEK
BY Baldwin & Wight
his ATTORNEYS

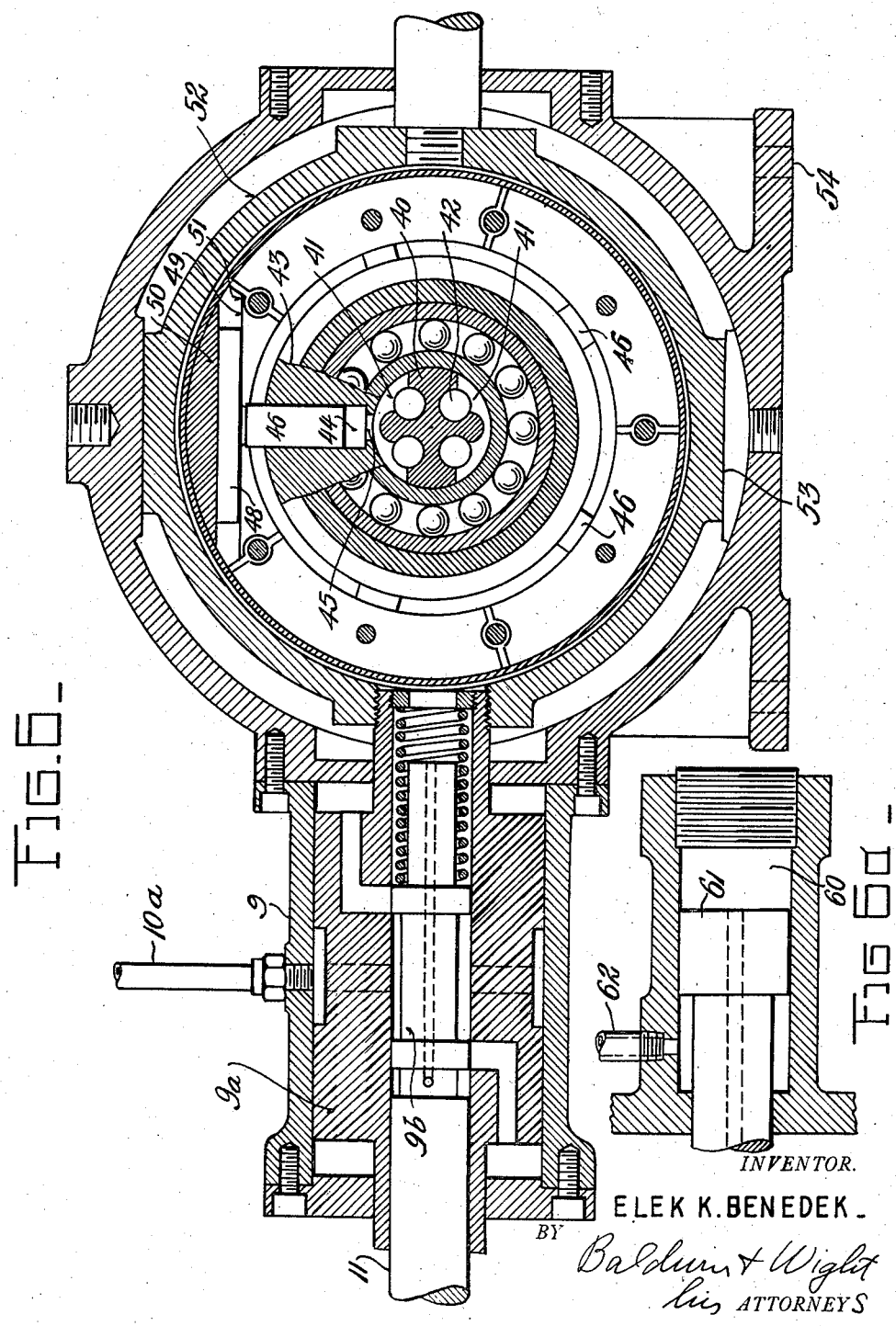

Aug. 14, 1945.  E. K. BENEDEK  2,382,389
PROPELLER MECHANISM
Filed May 24, 1941   11 Sheets-Sheet 6
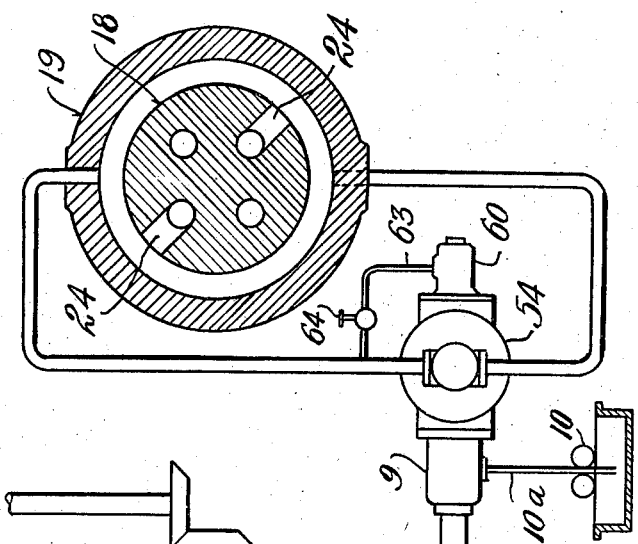
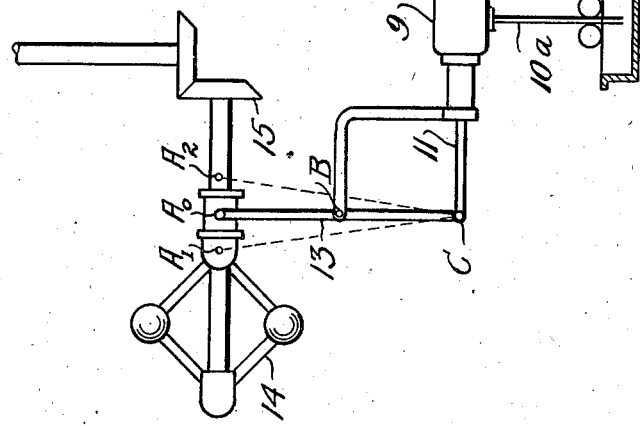
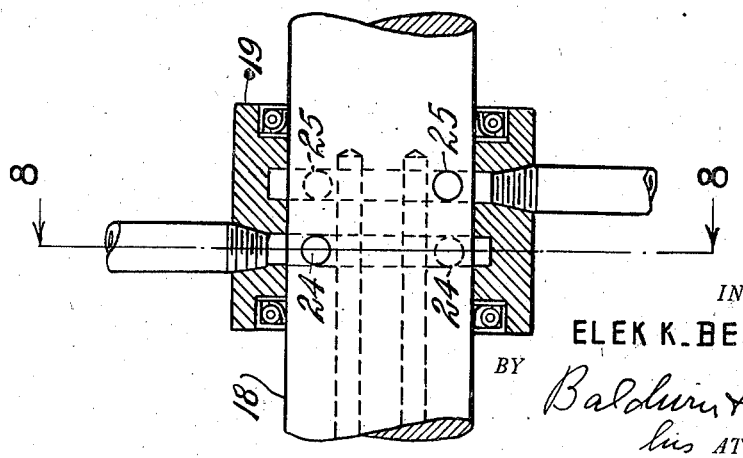
INVENTOR.
ELEK K. BENEDEK.
BY Baldwin & Wight
his ATTORNEYS Aug. 14, 1945.   E. K. BENEDEK   2,382,389
PROPELLER MECHANISM
Filed May 24, 1941   11 Sheets-Sheet 7
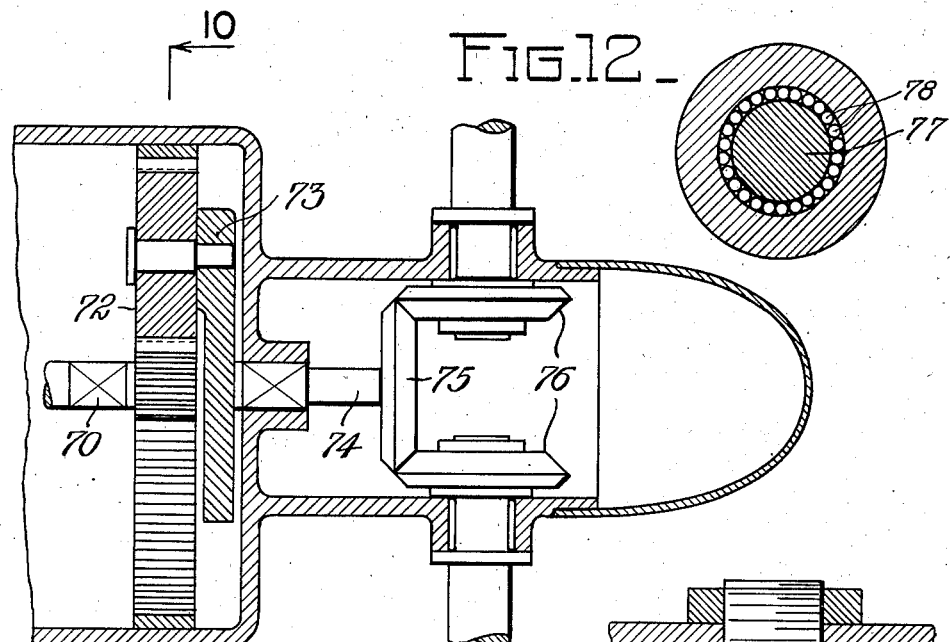
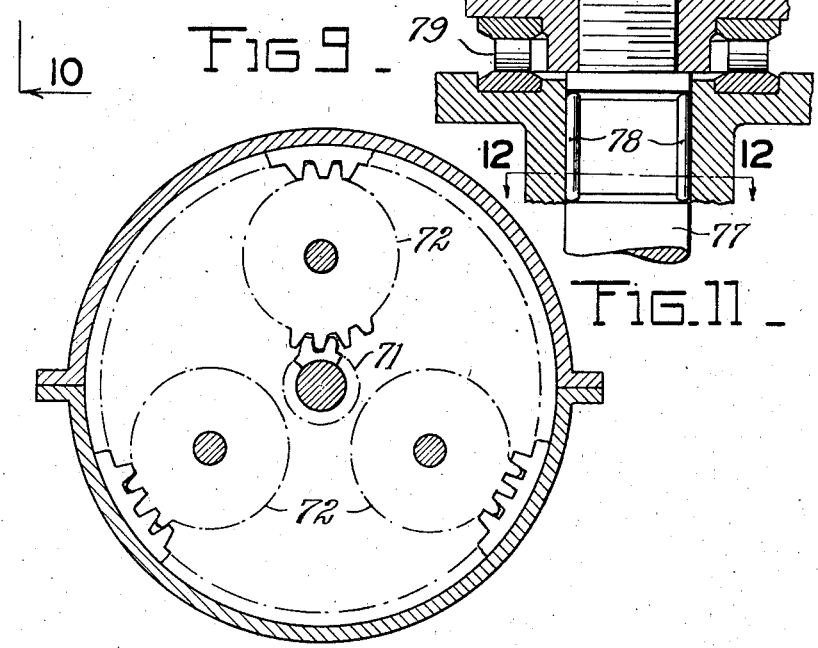
INVENTOR.
ELEK . K . BENEDEK .

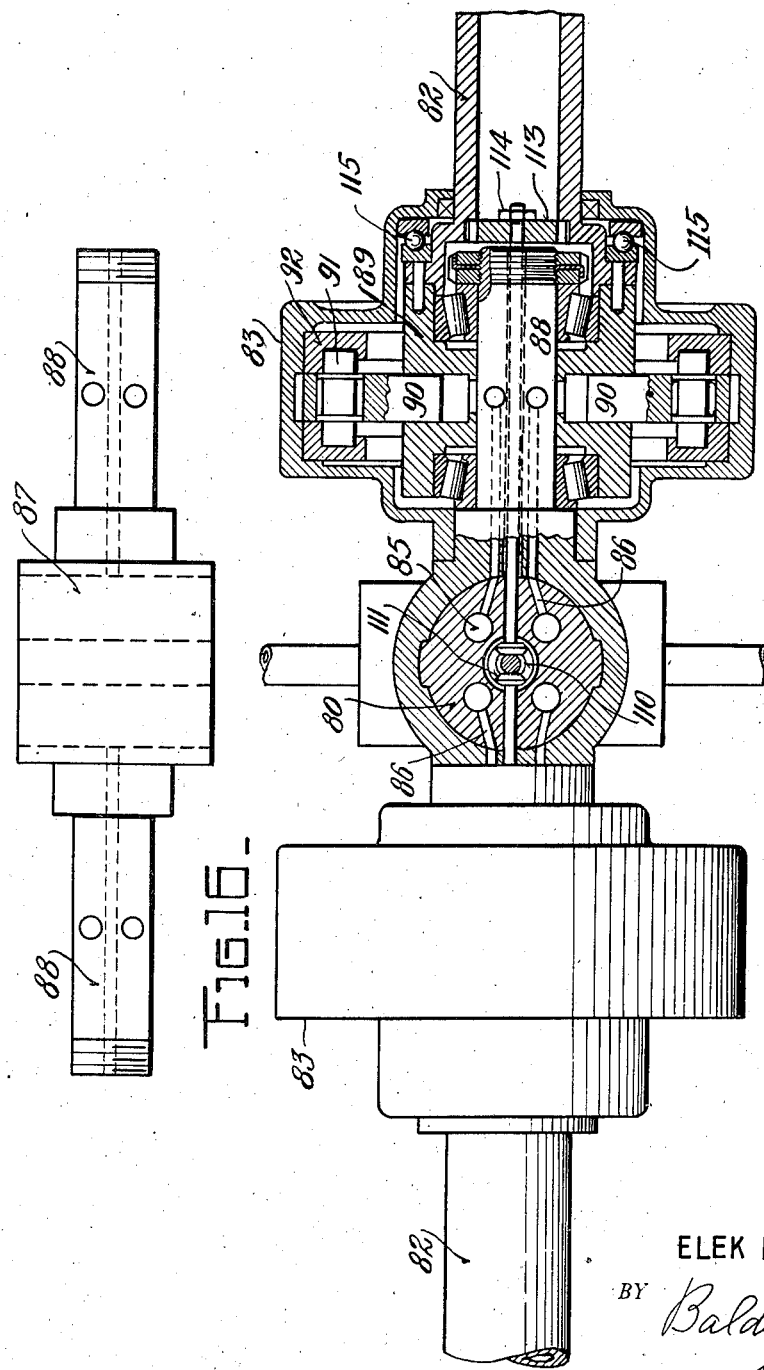

Aug. 14, 1945.  E. K. BENEDEK  2,382,389
PROPELLER MECHANISM
Filed May 24, 1941  11 Sheets-Sheet 9

INVENTOR.
ELEK K. BENEDEK
BY Baldwin & Wight
his ATTORNEYS

Aug. 14, 1945. E. K. BENEDEK 2,382,389
PROPELLER MECHANISM
Filed May 24, 1941 11 Sheets-Sheet 10
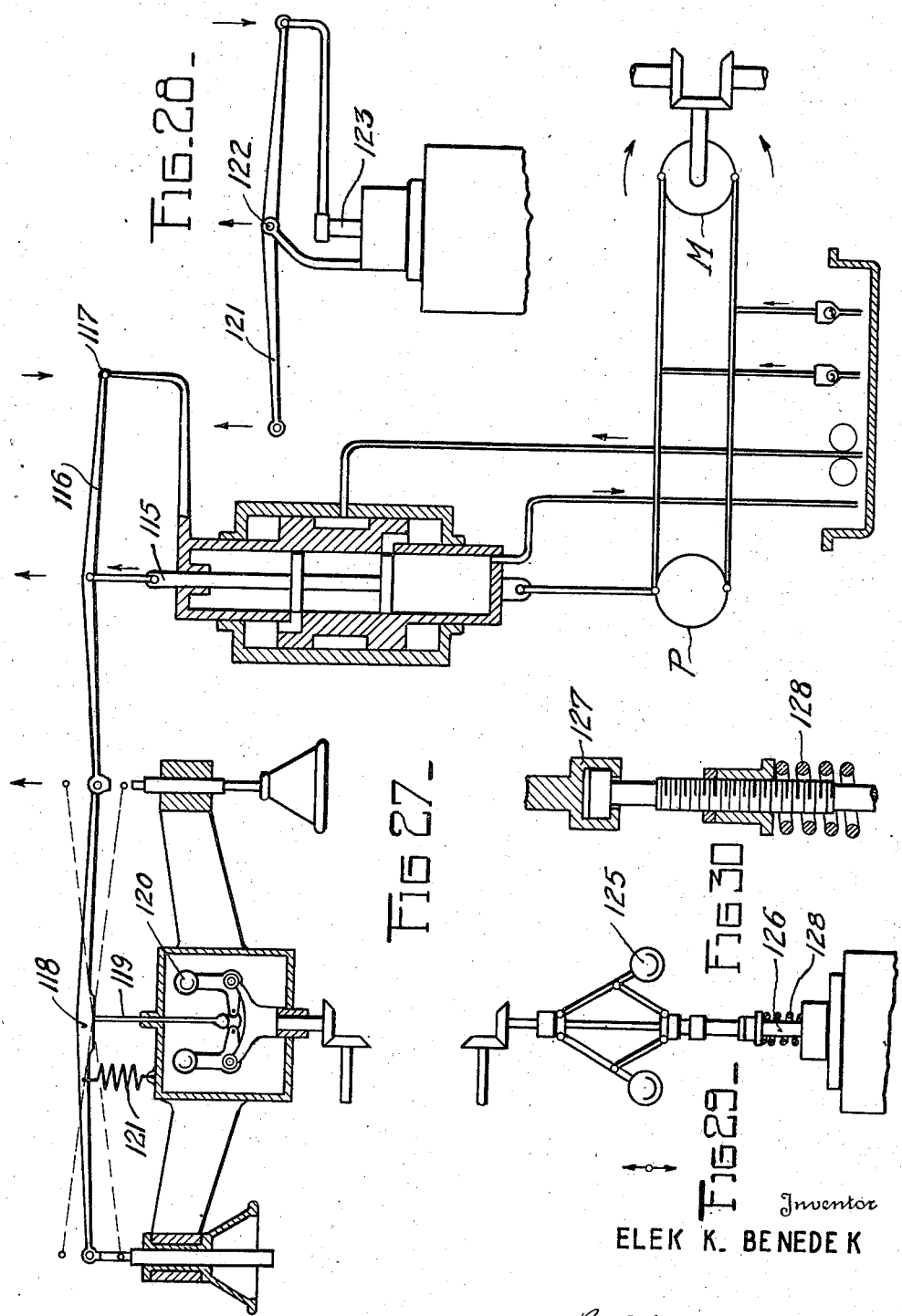
Inventor
ELEK K. BENEDEK
By Baldwin & Wight
his Attorneys INVENTOR.
ELEK.K.BENEDEK
BY Baldwin & Wight
ATTORNEYS Patented Aug. 14, 1945

2,382,389

UNITED STATES PATENT OFFICE 2,382,389

PROPELLER MECHANISM

Elek K. Benedek, Bucyrus, Ohio

Application May 24, 1941, Serial No. 395,080

1 Claim. (Cl. 170—163)

This invention relates to feathering variable pitch propellers, and particularly to a hydraulic mechanism for controlling the output of the engine by varying the pitch of airplane propeller blades.

Variable pitch propellers with limited means for angle control have been provided heretofore for use in connection with airplanes.

Originally the pitch was changed only between two limits, these limits being very little and of a maximum of 5° to 10°. The demands of the industry now require that the range of pitch adjustment be controlled steadily and positively and that "feathering" of the propeller be made possible. This is particularly true in connection with the growing tendency toward the use of power descents in airplanes.

It is one of the objects of the present invention to provide a propeller and pitch control mechanism therefor by which the propeller can be made to function as a constant speed propeller but with an increased range of blade pitch adjustment.

Another object is to provide a propeller and control mechanism by which the pitch of the propeller blades can be changed or adjusted in emergencies to a more nearly completely "feathered" position, that is, a position in which their chord is approximately parallel to the line of flight, so that the propeller blades act as brakes for reducing the engine rotation.

Another object is to provide for effecting this operation in relatively few seconds so that the engine may be stopped promptly in case of any engine failure and the drag of the dead propeller on the airplane can be greatly reduced.

The present invention is characterized in that it is more simple than the structures heretofore provided for the same purpose, and provides a larger range of pitch control than unreliable hydraulic elements such as sleeves, valves, and low pressure elements heretofore used, thereby insuring greater reliability, and constant maximum engine horsepower at constant engine speed.

The principal objects of the present invention are to provide a hydraulic mechanism for the purposes described, by which unlimited pitch range and quick feathering can be obtained, for example, when one of the engines must be stopped, due to engine troubles; by which a simple and effective oil circuit is provided between actuating and governing elements; positive, continuous, and instantaneous response of pitch angle to the change in engine speed is effected; the actuating hydraulic means is directly or indirectly actuated by the engine speed; backlash and lost motion of the propeller blades during pitch change are eliminated; positive and continuous torque is provided for regulating the pitch of the propeller blades and for maintaining them in the desired position of power and load equilibrium; and the propeller blades may be completely reversed and pitched to any desired angle in either direction from a normal or neutral position.

Other objects and advantages will become apparent from the following specification wherein reference is made to the drawings in which:

Fig. 1 is a diagrammatic illustration of a preferred embodiment of the present invention employing a reversible fluid pressure circuit including a pump, a hydro-motor, and means to control the circuit in response to engine speed change, and with the motor mechanically drivingly connected to the blades of the propeller;

Fig. 4 is a longitudinal sectional view of the propeller hub and motor assembly and is taken on a plane indicated by the line 4—4 in Fig. 3;

Fig. 6 is a cross-sectional view through the variable delivery pump used in connection with the present invention and with a hydraulic servomotor used in connection therewith;

Fig. 6a is an axial sectional view of a stroke adjusting means which may be used at the right-hand side of the pump illustrated in Fig. 6 for quick feathering of the propeller;

Fig. 7 is an axial sectional view through the propeller drive shaft, illustrating the oil transfer ring and the manner in which the fluid pressure is supplied to the hydraulic motor, the shaft being shown in elevation for clearness in illustration;

Fig. 8 is a sectional view taken on a plane indicated by the line 8—8 in Fig. 7, the hydraulic circuit being diagrammatically illustrated in connection therewith;

Fig. 9 is a sectional view of the propeller hub showing a planetary speed reducing gear connection between the hydro-motor and the propeller blades and is a modification of the structure illustrated in Figs. 1 to 8;

Figure 17:
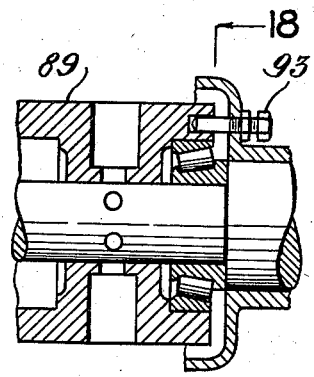
Figure 26:
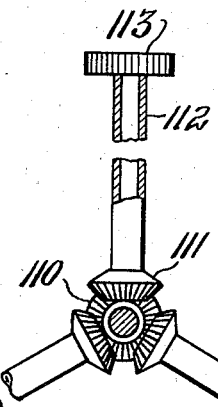
Figure 18:
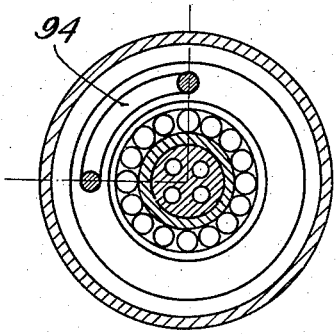
Figure 3:
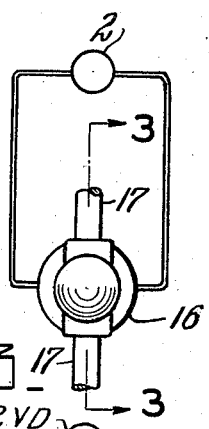
Figs. 2 and 3 are diagrammatic front and side elevations, respectively, of the propeller and motor illustrated in Fig. 1, the pump being shown diagrammatically in connection therewith for clearness in illustration.
Figure 2:
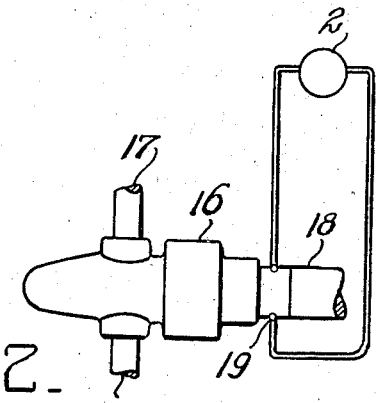
Figure 19:
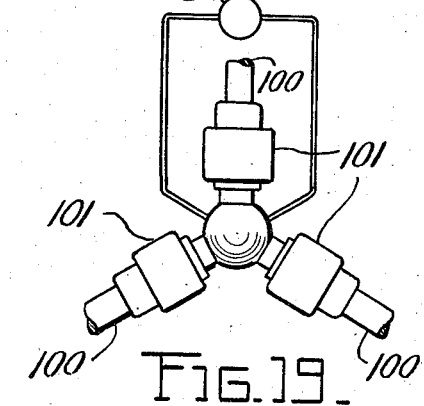
Figure 20:
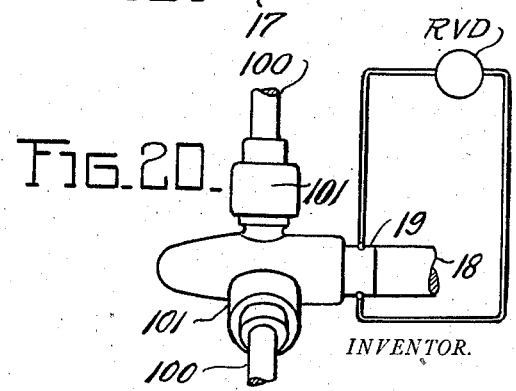
Figure 21:
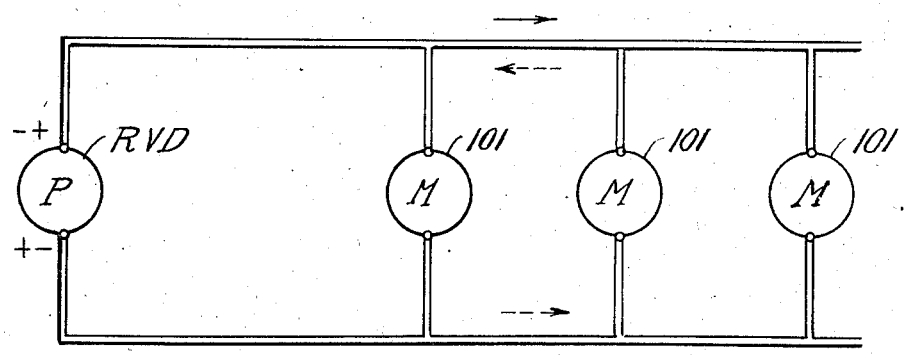
Figures 22, 24, 25:
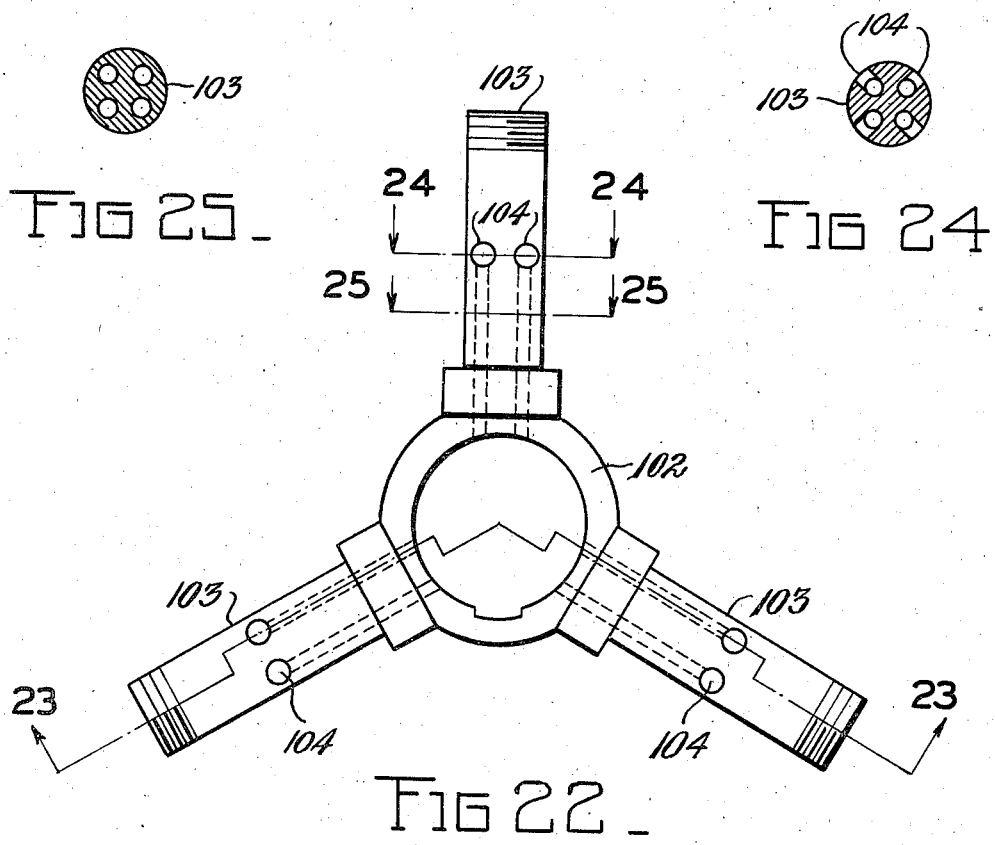
Figure 23:
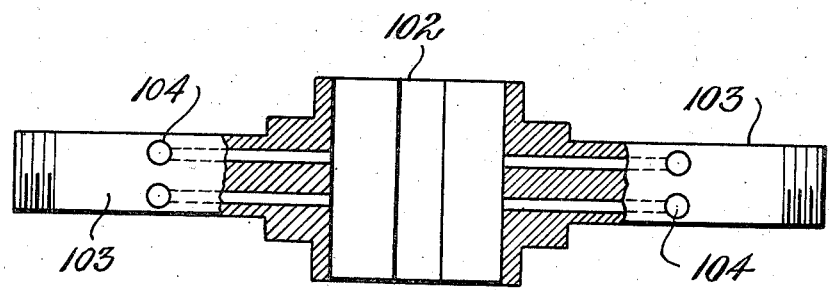
Figure 32:
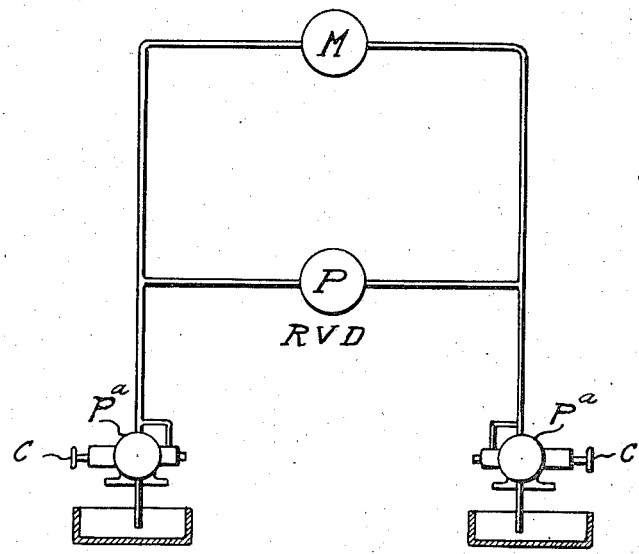
Figure 31:
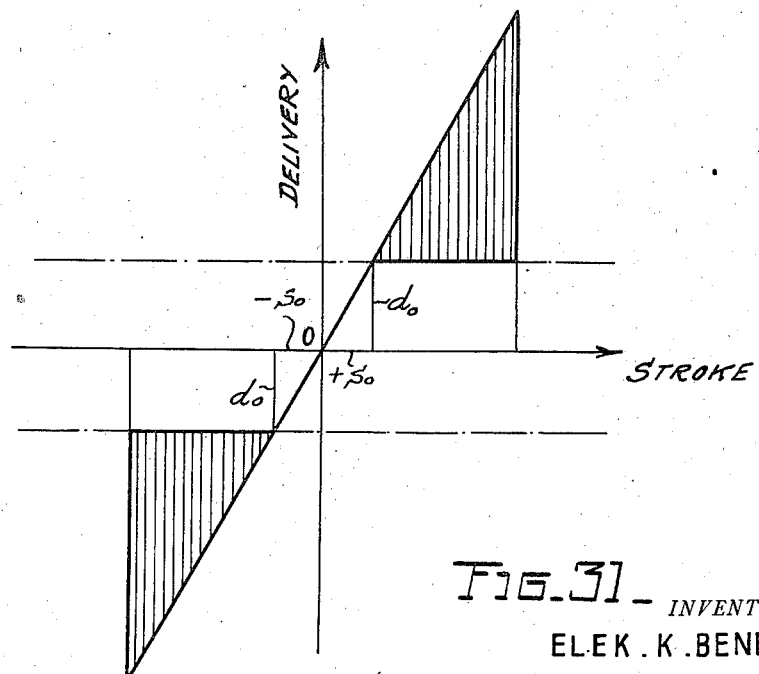

Figs. 10 and 11 are sectional views taken on planes indicated by the lines 10—10 and 11—11, respectively, in Fig. 9;

Fig. 12 is a sectional view taken on the plane indicated by the line 12—12 on Fig. 11;

Figs. 13 and 14 are front and side elevations, respectively, of a propeller employing radially disposed hydro-motors for controlling the pitch of the propeller blades;

Fig. 15 is an enlarged cross-sectional view taken on the plane indicated by the line 15—15 of Fig. 13;

Fig. 16 is an elevation of the fluid distributing pintle used in connection with motors illustrated in Fig. 15;

Fig. 17 is a fragmentary section similar to Fig. 15 showing mechanical limiting means for the hydro-motor and propeller, respectively;

Fig. 18 is a sectional view taken on the plane indicated by the line 18—18 in Fig. 17;

Figs. 19 and 20 are diagrammatic front and side elevations, respectively, of a three-blade propeller employing radially disposed hydro-motors such as described in connection with Figs. 13 to 18, inclusive;

Fig. 21 is a diagrammatic illustration of the connection between the pump and the radially disposed hydro-motors such as illustrated in Figs. 19 and 20;

Fig. 22 is the fluid distributing valve or pintle of the three-blade propeller;

Figs. 23 to 25, inclusive, are sectional views taken on planes indicated by the lines 23—23, 24—24, and 25—25, respectively, of Fig. 22;

Fig. 26 is a digrammatic illustration of the synchronizing gear mechanism for a three-blade propeller in which all three blades are controlled from a single hydro-motor which is disposed axially with respect to the propeller shaft;

Fig. 27 is a diagrammatic illustration of a static and indirect control system between the engine and propeller including a hydraulic control power means;

Fig. 28 is a similar control system to that illustrated in Fig. 27, except that the connection of the servo-motor with the pilot valve plunger is reversed as compared with the arrangement in Fig. 27;

Fig. 29 is a diagrammatic illustration of a static control directly connected to the servo-motor for effecting the operations effected by the structure illustrated in Fig. 27;

Fig. 30 is an enlarged axial sectional view showing the connection between the governors and the rod of the servo-motor of Fig. 29;

Fig. 31 is a graphical representation of the effect of slip in a reversible, variable stroke, high pressure pump;

Fig. 32 is a modified circuit employing auxiliary power means for reducing hydraulic back-lash;

Fig. 33 is a diagrammatic illustration of a circuit similar to Fig. 1, but employing a non-reversible pump and constant pressure control with valve means for reversing the flow of the pump with respect to the motor.

Referring first to Figs. 1 to 12, inclusive, the invention is embodied in an apparatus wherein the pitch of the propeller blades is changed and set by a single hydro-motor which is coaxial with the hub or rotational axis of the propeller and usually also with the engine crank shaft. The hydraulic elements may comprise a motor 1 which can be reversed by reversal of the delivery of the pump so that the motor shaft may swing through an angle $a$ in either direction from a neutral or normal operating position, as indicated at $n$ in Fig. 1. Reversal of the motor may be effected also by suitable valves and a one-way pump, as described hereinafter.

The motor is connected to a variable delivery pump 2 in a circuit comprising pipes 3 and 4 leading from opposite sides of the pump to opposite sides of the motor. The opposite sides of the pump circuit are connected to a sump by pipes 5 and 6, respectively, these pipes being provided with pressure check valves 7 and 8. Oil pressure fluid is supplied to the servo-motor 9 through a suitable pipe 10a from the gear pump 10 of the engine to actuate the servo-motor which is operative to vary or reverse the pump stroke while the pump continues to be driven in the same direction. The pilot valve of the servo-motor, in turn, is connected by a suitable rod 11 to a hand-operated rock lever 12 so that the stroke of the pump may be adjusted or reversed by hand. The rod 11 may be connected also to a lever 13 operated by a governor 14 which, in turn, is driven through appropriate means, such as flexible shaft and gears 15, from the engine of the airplane or vehicle. Thus independent hand and governor control are obtained. The pump is continuously driven from the engine of the airplane or vehicle. Consequently, its delivery may be under the control of the governors 14 at all times and, as a result, the setting of the motor 1 and the pitch of the propeller blades may be controlled in a direct relation to the speed of the engine or prime mover.

The motor 1 is mounted in a rigid housing 16 which forms the propeller hub and forwardly from which extends a portion in which the propeller blades 17 are mounted. The propeller housing 16 and blades are rotated primarily about the propeller axis by the main drive or crank shaft 18 of the engine, the connection between the pump and the motor being effected by means of an oil transfer ring 19.

Figure 5:
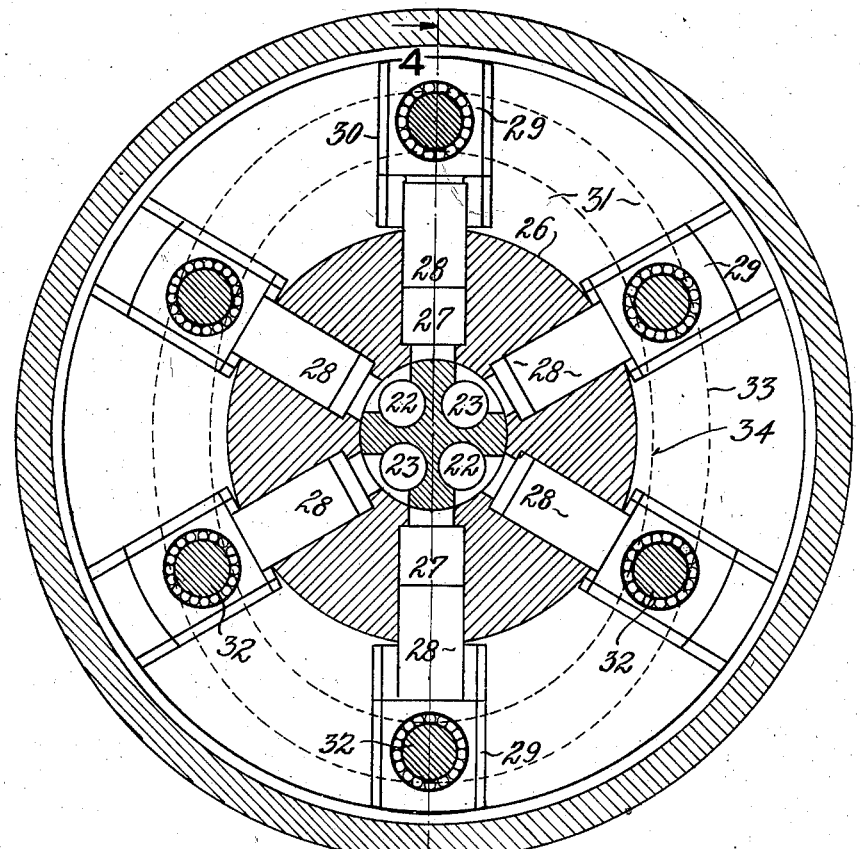
Fig. 5 is a sectional view taken on a plane indicated by the line 5—5 in Fig. 4.

Referring next to Figs. 4 and 5, both the hydro-motor 1 and the housing 16 rotate with the propeller or engine shaft 18, the housing 16 being fixedly secured thereto by splines 20. The outer end portion of the shaft 20 is constructed in the form of a valve pintle 21, but this pintle may be made separate and attached to the shaft. The pintle 21 has sets of reversible ports 22 and 23, connected by internal ducts, as illustrated, with reversible ports 24 and 25, respectively, in the shaft 18. Mounted on the pintle 21 for rotation relative thereto is a rotatable barrel 26 having a plurality of radial cylinders 27, each cylinder having a port arranged for successive cooperation with the ports 22 and 23 as the barrel rotates relative to the pintle. Mounted in the cylinders are radial pistons 28, each of which has a head portion 29 guided in suitable guideways 30, in a radial flange 31 on the barrel. Each cross-head 29 carries cross pins 32 which are rotatable therein on anti-friction needle rollers. The ends of the cross-pins 32 project beyond the heads 29 and engage a reactance means with which they cooperate for effecting rotation of the barrel when fluid pressure is introduced into the cylinders in the proper valving relation. In the form illustrated, an elliptical hydraulically balanced reactance means is provided and comprises outer cam rings 33 and inner cam rings 34 parallel thereto, these rings forming cam tracks with which the ends of the cross pins 32 are in rolling engagement. Thus the barrel can be caused to rotate relative to the shaft 18. Fixedly secured to the barrel at its outer end and coaxial therewith is a synchronizing bevel gear 35 which cooperates with bevel gears 36 mounted on the inner ends of the hubs of the propeller blades 17. This motor is more fully described in my United States Patent No. 2,111,657, but motors described in my United States Patent Nos. 2,097,830 or 2,101,731 are equally applicable for this purpose.

The propeller blades 17 have their hubs mounted anti-frictionally in a rigid housing 37 which is rigid with the housing 16 and rotates therewith. Thus, the blades can, through the medium of the bevel gears, be rotated about the axis of their hubs so as to change the pitch of the blades.

The oil transfer ring 19 is arranged for connecting the pump with the motor through the ports 24 and 25, as heretofore described. Thus, by admitting fluid from the pump to the motor, the barrel 26 can be rotated relative to the propeller shaft or crank shaft 18 and change the setting of the propeller blades and hold the blades in the condition set by controlling the delivery of the pump as hereinafter will be more specifically described. For example, the pressure and delivery of the pump can be increased to move the blades to a predetermined setting and then adjusted so as to supply only slip fluid for maintaining the blades in the set condition. As heretofore explained, this may be accomplished automatically.

The connection between the pump and the motor is better illustrated in Fig. 8, which shows the intermediate oil-transfer ring 19 to valve the discharge of the pump into the motor.

Referring next to Figs. 6 and 6a, a preferred embodiment of the pump for use in connection with the hydraulic mechanism is illustrated and is the pump more fully described in my United States Patent No. 1,876,833. Other designs such as shown in United States Patents Nos. 2,111,657 or 2,097,830 are equally applicable for this use.

The illustrative pump comprises a valve pintle 40 having reversible valving ports 41 and ducts 42, the ports 41 being pressure or suction ports, depending upon the setting of the shifter ring of the pump. Mounted for rotation about and fitting the pintle is a rotatable barrel 43 having radial cylinders 44 and valve ports 45 arranged for successive cooperation with the ports 40 as the barrel rotates. Mounted in the cylinders are radial reciprocable pistons preferably having T-heads 48 which engage a rotary reactance 49 for reciprocating the pistons consequent upon rotation of the barrel when the reactance is in an eccentric relation to the piston. In the form illustrated, the reactance comprises rings supporting thrust plates 50 which bear against the outer surface of the T-heads 48, respectively, and form with surfaces 51 of the rings chordal slots for slidably accommodating the T-heads. The rotary reactance is carried in a stator 52 which is supported, as indicated at 53, within a casing 54 of the pump. The reactance can be adjusted in a straight line through the median plane of the bridges which are between the pintle valve ports, from a position of eccentricity to one side of the pintle axis to a position of eccentricity at the opposite side. When the reactance is set to one side of the pintle axis, rotation of the pump barrel 43 causes one of the ports 41 to become a pressure port and the other port 41 to become a suction port. Shifting the reactance in the opposite direction from the center position will reverse the pump discharge and flow through the ports 41. For shifting the reactance, the engine driven governor 14 is interconnected with the hydraulic servo-motor 9, as hereinafter will be more specifically described.

The servo-motor 9 is arranged so that its power cylinder 9a is moved by fluid-pressure in a direction opposite to the direction of movement of the pilot plunger 9b. This cooperation of the pilot and power plungers is desirable for feathering, as appears more fully hereinafter.

Referring next to Fig. 6a, the servo-motor may be supplemented with a cylinder 60 and a piston 61, one side of the piston being connected by a duct 62 and a pipe line 63, as illustrated in Fig. 8, to the pressure side of the auxiliary pump. Thus the stroke can be controlled by the control of pressure introduced from the piston 61 by means of the valve 64.

Referring next to Figs. 9 to 12, a mechanical reduction gearing is used between the shaft of the hydro-motor and the propeller blades for increasing the turning moment of the motor. In this modification, the hydro-motor shaft 70 carries a small gear 71 which is drivingly connected to gears 72, which are connected to a disc 73 having a shaft 74 on which is mounted a bevel gear 75. The bevel gear 75 is drivingly connected to the bevel gears 76 of the respective propeller blades so that reduction is provided between the shaft 70 of the main bevel gear 75. In connection with Fig. 11, the propeller hub 77 is mounted on elongated cageless needle rollers 78 and thrust bearings 79, for withstanding transverse and centrifugal forces.

Referring next to Figs. 13 and 14, a modification is shown in which the drive shaft or propeller shaft 80 is connected with a housing 81 which supports a plurality of propeller blades 82 for rotation about their own axis. In this form of the invention, hydro-motors are provided and mounted radially and have their drive shafts coaxial with the propellers respectively, one such hydro-motor being provided for each propeller or blade. In the forms illustrated in Figs. 13-16 inclusive, two radial blades are provided and fluid pressure is supplied to the motors 83 from a suitable variable delivery pump, such as heretofore described, and which may be controlled in the manner hereinafter to be described. The pump is connected to suitable ducts in the drive shaft 80 by an oil transfer ring 84. The drive shaft 80 is provided with ducts 85 which are connected to the reversible ports of the pump, respectively, and which in turn connect with suitable ducts 86 in a double and radial pintle 87. The pintle 87 is secured onto the shaft 80 for rotation therewith, as illustrated in Fig. 15. On the ends 88 of the pintle portions are mounted hydro-motors such as described in connection with Fig. 4 and comprising generally a rotatable barrel 89 carrying radial pistons 90, which, through the medium of pins 91, cooperate with the reactance 92 for effecting rotation of the barrel 89 with respect to the pintle portion 88 upon the proper valving of fluid from the pump to the hydro-motor in a well-known manner. The hubs 92 of the propeller blades are directly connected to the outer ends of the associated barrel 89 for rotation directly therewith and supported radially on anti-friction thrust means. Thus, by proper manipulation of the pump, the fluid supplied to the hydro-motors can be delivered at the required amount and direction and the motors can be reversed, if desired, simply by reversing the stroke of the pump. Thus, though the engine is driven in the same direction, any desired pitch in forward or reverse can be given to the propellers.

Referring next to Figs. 17 and 18, the barrel 89 is shown as provided with a limit stop 93 which operates in a groove 94 in the end of the barrel for limiting the direction of movement of the pump to maximum positions at each side of the normal position or into completely feathered position of the propeller blade.

In Figs. 19–25 inclusive, there is illustrated an arrangement similar to that shown in Figs. 13 and 14 except that a three-blade propeller 100 is provided and each blade is operated by its individual hydro-motor 101 by a variable delivery pump. In such an arrangement, the motors 101 are connected in parallel with the pump as illustrated diagrammatically in Fig. 21. For use in connection with three-blade propellers, the pintle is in the form of a central hub 102 with radial pintle portions 103 extending therefrom, each pintle portion being provided with the required ports 104 for cooperation with the cylinders of the particular barrel to be associated therewith. The motors are of the general character or form described and illustrated in Figs. 4, 5 and 15.

Referring next to Fig. 26, there is diagrammatically illustrated an arrangement such as described in connection with Fig. 9 except that it is adapted for a three-blade propeller instead of a two-blade propeller. In this form the main bevel gear 110 is arranged for rotation with the barrel of the hydro-motor, or is driven thereby through the medium of a speed-change gear as described in connection with Fig. 9. The gear 110 in turn drives the gears 111 which are rigidly connected to the inner ends of the hubs 112 of the propeller blades. Obviously, any movement of propeller blades may be operated from the same hydro-motor or by the introduction of a separate hydro-motor for each. Furthermore, the motor is reversible in operative effect and simply by reversing the pump.

For efficient drive under stationary performance where there is an equilibrium between load and engine output, it is necessary that the governor remain absolutely at rest to maintain the equilibrium, that is, the governor sleeve shall have no periodical up and down movement on its spindle during such condition. This requires that at each position of the chord angle of the propeller and a given R. P. M. of the engine, the pilot valve of the servo-motor must be at rest in its middle position. Only under these conditions can a new equilibrium between load and power prevail after the old equilibrium has been distorted.

This balanced control method provides a static or stable system as contrary to an astatic or unstable system or condition, in which latter, the governor either over or under controls, and its sleeve migrates all the time. In order to accomplish a permanent and stationary equilibrium between load and engine output at all times, the control mechanism illustrated in Figs. 27 and 28 may be employed. For example, the pilot plunger 115 of the servo-motor is operated by a lever 116 which is fulcrumed on a stationary fulcrum 117. The lever 116 in turn is operated by a lever 118 which rocks about the governor power plunger 119 as a fulcrum. The plunger 119 is raised and lowered by the governor 120 operated by the engine. A spring 121 is connected between a suitable stationary abutment of the lever 118, and, in the form illustrated, urges the lever 118 in a counter-clockwise direction. The left-hand end of the lever 118 in Fig. 27 is adjusted by the operator for obtaining the desired engine speed, while the right-hand end of the lever 118 adjusts the travel of the blade during adjustment of the engine speed so that both the engine speed and the angularity of the blades are adjustable. The right-hand end of the lever 118, when the lever swings about the plunger 119, moves the pilot valve 115 in the same direction. Upon upward shifting of the pilot valve 115, the plunger 119 descends and brings the pilot valve back to its original or middle position as the speed of the engine is decreased due to the increase in the pitch of the propeller. In this middle position of the pilot plunger 115, the pump is at neutral and the propeller motor M, and with it the blades of the propeller, are hydraulically locked at the prevailing speed of the engine. Thus, there is a stable equilibrium between the propeller load and the engine output of power. Upon downward shifting of the pilot valve 115, the power plunger 119 ascends and the various elements above described move in the opposite direction from those indicated by the arrows, and thus finally again re-establishing stationary equilibrium by bringing the pilot plunger 115 into its neutral or middle position.

It will be noted that in Fig. 27, a mid-portion of the lever 116 is connected to the pilot valve 115. If a reverse relation between the governor 120 and the pilot valve 115 is desired, connection may be made as illustrated in Fig. 28, in which the lever 121, corresponding to the lever 116, is mounted on the stationary pivot or fulcrum between its ends as indicated at 122, and one end of the lever 121 being connected to the lever 118 as described. The opposite end of the lever 121 is connected to the pilot plunger 123 corresponding to the pilot valve 115, above described. Thus, for a given movement of the lever 118, the operation of the pilot valve 123 will be the reverse of the operation of the pilot valve 115 by the same movement of the lever 118. Thus, both operations can bring the plunger to its neutral position and stop further movement of the blades at the desired pitch angle. The pilot valve 115 is thus operated by the governor 120 in the same direction relative to the speed of the engine as the pilot valve 11 is operated by the governor 14 in Fig. 1.

In Figs. 29 and 30, there is shown a direct connection between a governor 125, corresponding to the governor 120, and the servo-motor pilot valve 126, corresponding to the valve 115 or 123, the sleeve 127 of the governor 125 being directly connected to the stem of the plunger 126. When the governor operates to lift its sleeve 127, it thereby lifts the pilot valve 126. By means of a spring (not shown) at the opposite end of the servo-motor, the servo-motor is urged back to its neutral or middle position. The reverse effect is obtained by the spring 128 when the engine speed drops and the plunger 126 is moved in the opposite direction by the governor. Thus, the spring 128 corresponds in function to the spring 121 of the lever 118 in Fig. 27.

By the arrangement illustrated in Figs. 28, 29 and 30, a direct control is provided between engine output and propeller load instead of the indirect control illustrated in Fig. 27. In both instances, the governor is driven by the engine, by any appropriate means. The other spring referred to above in connection with Fig. 29, but not shown, is arranged to urge the pilot plunger 126 back to its closing or neutral position.

Referring next to Fig. 31, there is effective slip in the reversible, variable stroke, high pressure pump which causes a so-called hydraulic "backlash" during the slip stroke $S_0$ in either direction of shift, due to the fact that the slip volume $D_o$ causes only an internal flow which is a loss and not effective as external output. In order to eliminate this hydraulic backlash from the pump and motor circuit, an auxiliary source of power may be introduced on each side of the circuit, as illustrated on Fig. 32, wherein a one-way pump equipped with an automatic pressure control C will maintain a constant pressure on each side of the neutral during reversal of the main pump stroke. The auxiliary pumps $P_a$ are so dimensioned that they may supply the intake fluid of the main pump, and thus the pressure check valves and suction valves may be eliminated.

Referring next to Fig. 33, there is illustrated a reversible circuit similar to Fig. 1, except that instead of a reversible pump or servo-motor, a one-way pump equipped with a constant pressure control C is used with a four-way valve V for reversing the flow to the motor. The four-way valve V may be directly or indirectly connected to or actuated by the governor, such as the governors described in connection with Figs. 27 to 30. In operation, the control spring of the control C is adjusted so that it counteracts the torsional moment of the propeller blades in a set position and automatically holds the equilibrium with this torsional moment when the valve is open in a given direction. When the valve V is shifted to reverse the direction of flow for effecting reversal of the motor, the pump automatically holds the blades in that position selected. The pitch is changed by pressure; as soon as the engine speed changes, the pressure increases or decreases and permits the changes of the stroke of the pump by the automatic pressure control to vary the chord angle of the blade according to the new equilibrium. Quick feathering can be obtained by increasing the pressure in this direction to overcome all moments acting on the blades as contrary to a normal cycle, where the counter-moment of torsion holds the propeller against the balancing pressure of the pump at an angle less than 90°. For feathering, the chord of the angle of pitch becomes parallel to the direction of flight. Thus, this circuit arrangement takes advantage of the counter-movement of the blades to reduce the pitch angle, and the hydraulic pressure really acts only to increase the pitch angle in one direction only toward the maximum limit of feathering.

Having thus described my invention, I claim:

In a propeller mechanism, a rotatable hub; hydraulic motor casings fixed to said hub at circumferentially spaced points to rotate therewith; propeller blades mounted on said casings respectively for pitch varying movements about axes radial to the axis of rotation of said hub; a rotary piston and cylinder assembly hydraulic motor in each of said casings, each motor having a central valve pintle whose axis is radial to the hub, each pintle being secured to the hub to rotate bodily about the hub axis, each motor also having a cylinder barrel rotatable about the associated pintle and sets of combined radial load and axial thrust transmitting roller bearings interposed between the pintle and cylinder barrel and spaced axially of the pintle, reactance means carried by the associated motor casing, pistons reciprocable in the cylinders radially with respect to the axis of the pintle, and connections between the pistons and the reactance means; and means securing said blades to the cylinder barrels of the respectively associated motors with the blades extending radially to said hub, whereby said roller bearings mount both said cylinder barrels and said blades to turn anti-frictionally on said pintles and without any movement radially of said hub.

ELEK K. BENEDEK.